United States Patent
Tang

[19]

[11] Patent Number: 6,128,131
[45] Date of Patent: Oct. 3, 2000

[54] SCALEABLE TILED FLAT-PANEL PROJECTION COLOR DISPLAY

[75] Inventor: Ching W. Tang, Rochester, N.Y.

[73] Assignee: Eastman Kodak Company, Rochester, N.Y.

[21] Appl. No.: 08/970,131

[22] Filed: Nov. 13, 1997

[51] Int. Cl.$^7$ .................................................. H04N 3/22
[52] U.S. Cl. ........................... 359/443; 353/30; 348/383; 348/744; 348/750
[58] Field of Search ................................ 345/1–3, 74, 75, 345/47, 903, 419, 425, 179, 517, 501, 507, 509, 348, 519, 508, 521; 348/67, 383, 744, 756, 839, 217, 701, 750; 359/326–332, 285–7, 305, 315, 316, 193, 443; 353/30–31

[56] References Cited

U.S. PATENT DOCUMENTS

| | | |
|---|---|---|
| 5,015,999 | 5/1991 | Imai et al. . |
| 5,298,363 | 3/1994 | Weiss . |
| 5,422,693 | 6/1995 | Vogeley et al. ........................ 353/122 |
| 5,424,771 | 6/1995 | Yu ........................................... 348/203 |
| 5,473,396 | 12/1995 | Okajima et al. . |
| 5,664,032 | 9/1997 | Bischel et al. ............................. 385/4 |
| 5,764,403 | 6/1998 | Downing ................................. 359/326 |
| 5,788,352 | 8/1998 | Montroy et al. ......................... 353/30 |

FOREIGN PATENT DOCUMENTS

94/18802  8/1994  WIPO .

OTHER PUBLICATIONS

A. Abileah and Z. Yaniv, titled "Optical Tiled AMLCD for Very Large Display Applications", SPIE, vol. 1664, High Resolution Displays and Projection Systems, pp 241–243, 1992.

R. Samadani, J. Lanham, D. Loomis, L. Silverstein, and J. Larimer, in a publication titled "Periodic Plane Tilings: Application to Pixel Layout Simulations for Color Flat–Panel Displays," Journal of the SID, vol. 2/2, pp 95–104, 1994.

*Primary Examiner*—Safet Metjahic
*Assistant Examiner*—Etienne P LeRoux
*Attorney, Agent, or Firm*—Raymond L. Owens

[57] ABSTRACT

A flat-panel projection color display including a flat projection display screen having a width dimension and a height dimension defining a display screen area A, the display screen having a light transmissive support which has on one surface thereof a plurality of patterned fluorescent elements capable of emitting red, green, or blue color light and at least one laser scanner for producing a raster-scanned laser light beam and for projecting the beam onto the display screen as a display tile from a projection distance which is $\leq 0.5\sqrt{A}$. The display screen causes the laser light beam to illuminate selected fluorescent elements within the display tile on the screen, the laser light beam having a wavelength selected to cause the selected fluorescent elements to emit red, green, or blue color light.

7 Claims, 8 Drawing Sheets

SCALEABLE TILED FLAT-PANEL PROJECTION COLOR DISPLAY

FIELD OF THE INVENTION

The present invention generally relates to displays and, more particularly, to a scaleable tiled flat-panel projection color display comprised of at least one laser scanner and a flat projection display screen.

BACKGROUND OF THE INVENTION

Recent years have seen the rapid development of displays based on liquid crystal display systems, cathode ray tube (CRT) display systems, organic electroluminescent display systems, and laser-based display systems. A portion of the display system development efforts appear to be directed to large area displays and, more particularly, to large area flat-panel displays. For example, in a publication by A. Abileah and Z. Yaniv, titled "Optical Tiled AMLCD for Very Large Display Applications", SPIE, Vol. 1664, High Resolution Displays and Projection Systems, pp 241–243, 1992, there is described a method of tiling a number of flat-panel liquid crystal displays (LCDs) to a continuous large display using magnifying fiber optic faceplates to cover the gaps between adjacent displays. R. Samadani, J. Lanham, D. Loomis, L. Silverstein, and J. Larimer, in a publication titled "Periodic Plane Tilings: Application to Pixel Layout Simulations for Color Flat-Panel Displays," Journal of the SID, Vol. 2/2, pp 95–104, 1994 discuss algorithms for pixel tilings and at minimizing a potentially objectionable observation of individual pixels in a display of pixels. U.S. Pat. No. 5,015,999 discloses a display unit for displaying two-dimensional images in which a two-dimensional array of organic electroluminescent elements emits ultraviolet light which is directed to a fluorescent screen having fluorescent materials emitting different colors of visible light. In a PCT International Patent Application No. WO 94/18802, there are disclosed methods and apparatus for image projection using linear laser arrays, with each laser array generating multiple parallel output beamlets at one of the three primary colors (red, green, and blue), combining the beamlets of the three colors into a plurality of white light beamlets which are then raster scanned in an optical scanning and projection system to be projected onto a screen. U.S. Pat. No. 5,424,771 discloses a video display device using laser generated radiation, in which respective red, green, and blue laser beams are combined and raster scanned by a rotating polygon and rotating lenses for projection onto a wall or a large, white surface. And U.S. Pat. No. 5,473,396 discloses a display apparatus in which ultraviolet emitting CRTs emit radiation representing red, green, and blue image information and projecting these UV emissions onto a large size fluorescent screen having a pattern of fluorescent materials which emit visible red, green, and blue light upon excitation by the UV rays from the CRTs.

While LCDs, in general, can be considered as flat-panel displays, their utility in providing very large area displays is restricted to the LCD used as a light valve in projection. Thus, an LCD light valve display is a display having a long projection distance and is, therefore, not a flat-panel projection display. CRT-based display devices become impractical for large display screen sizes and can not generally be considered in applications as flat-panel display systems due to the physical dimensions of cathode ray tubes. Display systems based on organic electroluminescent light emitting elements can be viewed as flat-panel displays, however, the display screen size or display screen area is limited by the size or area of available substrates for forming the organic electroluminescent elements.

Display systems utilizing laser light sources offer the principal advantages of high brightness and optical coherence of a laser beam over a distance sufficient to afford manipulation of the beam by beam deflection elements and beam scanning elements so as to make possible laser beam projection onto a display screen of a relatively large display screen area. In particular, the advent of semiconductor lasers (also referred to as laser diodes) has offered the possibility for display system designers to advance more compact laser-based display systems than was possible when more bulky gas laser sources were used.

In order to provide on a display screen a two-dimensional representation of information, a laser beam or laser beams, suitably intensity modulated, are projected onto the screen in a raster pattern which is generated in the form of horizontal laser beam scanlines which are advanced vertically along the display screen as a sequence of parallel scanlines. These horizontal scanlines are produced by sweeping a laser beam or laser beams across the display screen through reflection of the beams off the surfaces of multifaceted rotating polygonal mirrors. Each successive horizontal scanline is displaced vertically from a previous horizontal scanline by a second reflector which is also known as a galvanometer reflector. While the operational reliability of rotating multifaceted polygonal mirrors has been improved, such laser beam steering systems are complex and expensive. Moreover, particulate contamination or haze formation of one or several mirror facets would adversely affect the performance of such rotating laser beam deflectors. Accordingly, it is desirable to provide horizontal laser beam deflection or horizontal laser beam scanline formation by a non-rotating deflector element.

Currently known laser-based color projection systems deploy a fixed number of laser light sources, for example, a linear array of red light emitting, green light emitting, and blue light emitting laser sources, respectively. In such projection display systems, the viewable display area on a screen can, in principle, be increased from one area to a larger area by increasing the distance between the laser beam projection source and the screen. Stated differently, currently known laser projection display systems provide a fixed information content on a display screen, irrespective of the area covered by the display. Accordingly, it is desirable to provide a laser-based scaleable flat-panel color projection display in which both the number of laser light sources illuminating a display screen, and the display area of the screen can be readily scaled so as to meet user needs for projection displays which extend from relatively small area flat-panel color displays to relatively large area flat-panel color displays.

Presently known color projection display systems use a plurality of laser light sources dedicated to provide a plurality of primary color laser beams, followed by elements dedicated to combining these differently colored laser beams prior to a beam scanning or a beam rastering assembly. Thus, such systems require optically refractive and optically reflective elements capable of performing designated functions over a broad spectral range extending from red light to blue light. In order to achieve a comparable optical efficiency throughout that relatively broad spectral range, optical elements tend to require a more complex design which, in turn, increases the cost of such elements. Accordingly, it is desirable to provide a flat-panel projection display which uses a plurality of laser scanners each generating a raster-scanned laser light beam of one and a same wavelength, and generating a full-color display on a patterned fluorescent full-color display screen by projecting the raster-scanned laser light beams thereon.

SUMMARY OF THE INVENTION

It is an object of the present invention to provide a flat-panel projection color display.

It is another object of the present invention to provide a scaleable tiled flat-panel projection color display.

The object of providing a flat-panel projection color display is achieved by a flat-panel projection color display, comprising:

a) a flat projection display screen having a width dimension and a height dimension defining a display screen area A, the display screen having a light transmissive support which has on one surface thereof a plurality of patterned fluorescent elements capable of emitting red, green, or blue color light;

b) at least one laser scanner for producing a raster-scanned laser light beam and for projecting the beam onto the display screen as a display tile from a projection distance which is $\leq 0.5\sqrt{A}$; and c) means for causing the laser light beam to illuminate selected fluorescent elements within the display tile on the screen, the laser light beam having a wavelength selected to cause the selected fluorescent elements to emit red, green, or blue color light.

The object is also achieved by providing a scaleable tiled flat-panel projection color display, comprising:

a) a projection display screen of area A having a light transmissive support, a plurality of patterned fluorescent elements on one surface of the support capable of emitting red, green or blue light;

b) the display screen area A being subdivided into a plurality of identical display tiles, each individual display tile having an area $A_t$ and being seamlessly contiguous to at least one other display tile;

c) a plurality of identical laser scanners arranged to form a two-dimensional array, each laser scanner being capable of projecting a laser beam onto a designated display tile for illuminating the patterned fluorescent elements;

d) a projection distance D being defined as the distance from the laser scanner to the display screen, is $\leq 0.5\sqrt{A_t}$; and e) the area of an individual display tile $A_t$ being selected to be in the range of from 0.01 to 0.1 times the area A of the projection display screen.

The object is also achieved by providing a scaleable tiled flat-panel projection color display, comprising:

a) a flat projection display screen scaled to a selected width dimension and to a selected height dimension defining a selected display screen area A, the screen having a light transmissive support which has on one surface thereof a plurality of patterned fluorescent elements capable of emitting red, green, or blue light; and a plurality of identical laser scanners arranged to form a two-dimensional laser scanner array, the plurality of laser scanners of the two-dimensional array scaled in accordance with the scaled selected width and height dimensions of the display screen, each laser scanner of the two-dimensional array producing a raster-scanned laser light beam and projecting the beam onto the display screen as a designated display tile from a projection distance which is $\leq 0.5\sqrt{A}$, the laser light beam illuminating selected fluorescent elements within the designated display tile on the screen, each laser light beam having a wavelength selected to cause the selected fluorescent elements to emit red, green, or blue light, the plurality of the laser scanners of the two-dimensional scaled array projecting corresponding laser light beams onto the display screen as seamlessly abutting designated display tiles across a substantial portion of the display screen area, each of the designated display tiles having a tile width dimension and a tile height dimension defining a tile area which is in a range of from 0.01 to 0.1 times the display screen area A.

ADVANTAGES

Major advantages of the flat-panel projection display of the invention are: the display size or display area is scaleable to large areas without increasing the depth dimension, i.e. the projection distance, of the display; the fluorescent color display screen provides a continuous and seamless display of any size dimension; the fluorescent color display screen illuminated by laser light beams from laser scanner arrays provides a high display brightness; the fluorescent display screen can be manufactured using flexible and lightweight screen support materials such as, for example, plastic support materials; the laser scanners are modular to provide ease of assembly and ease of repair; each laser scanner produces a laser light beam having one and the same single wavelength of light, rather than the red, green, and blue (R, G, B) light laser light beams required of prior art laser projection color displays; and the fluorescent display screen can be produced economically on a support by high speed printing processes or by large area photolithographic processes.

It will be understood that the drawings are not to scale and have been shown for clarity of illustration.

DETAILED DESCRIPTION OF THE INVENTION

Figure 1:
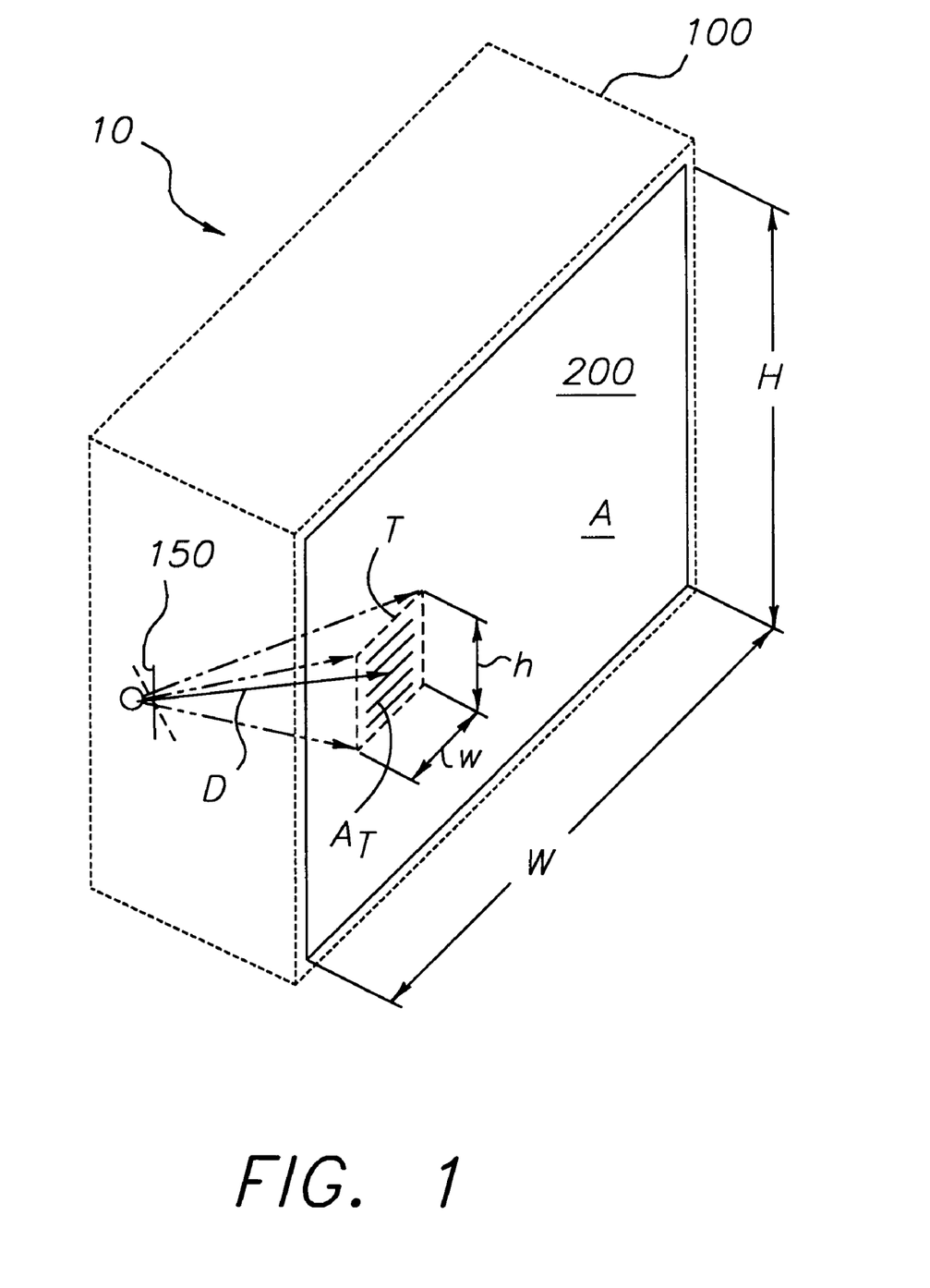
FIG. 1 is a schematic perspective view of a flat-panel projection color display in accordance with the present invention in which a tile T is projected onto a display screen from a distance D which is a fraction of the smaller of a width dimension W and a height dimension H of the screen.

Referring now to FIG. 1, there is shown a schematic perspective view of a flat-panel projection color display generally designated at 10, having a flat projection display screen 200 disposed in a projecting relationship with respect to at least one laser scanner 100 of which only one vertical raster generator 150 (an oscillating mirror) is shown for purposes of clarity. The vertical raster generator 150 of the laser scanner 100 projects onto the display screen 200 a laser light beam as a display tile T from a projection distance D. The projection distance D is the distance between the surface of the screen 200 onto which the laser light beam is projected and the vertical raster generator 150 when the laser light beam is at the center of the display tile T. The display tile T has width and height dimensions w and h which define a display tile area $A_t$. The display screen 200 has a width dimension W and height dimension H defining a display screen area A. The flat-panel projection display 10 is defined in that the projection distance D is $\leq 0.5\sqrt{A}$, i.e. less than or equal to 0.5 times the square root of the display screen area A of the display screen 200.

The display tile T projected onto the display screen 200 has a tile area $A_t$ defined by the product h×w of the height and width dimensions of the tile. For a selected display screen area A=H×W, the tile-center projection distance D from the display screen 200 to the vertical raster generator 150 of a laser scanner is at most equal to $\leq 0.5\sqrt{A}$ to maintain the flat-panel configuration of the display 10, as indicated above. The tile area $A_t$ of the projected tile T is directly related to the projection distance D and to the beam deflection capacity of a laser scanner of the present invention in the horizontal and vertical direction S. An additional requirement is that the aspect ratio w/h of the display tile T be substantially identical to the aspect ratio W/H of the display screen 200, for example an aspect ratio of 4/3. This latter requirement will be more readily appreciated when considering a plurality of laser scanners projecting a plurality of seamlessly abutting display tiles onto the display screen over substantially the full screen area A, as will be described with reference to FIGS. 5, 6, 7B, and 7C. In view of the above considerations, the tile area $A_t$ is preferably in a range of from 0.01 to 0.1 times the display screen area A.

As will be described hereinafter, the color display screen 200 has a light transmissive support which has, on one surface, a plurality of patterned fluorescent elements capable of emitting red, green, or blue light, respectively, in response to illumination by a laser light beam having a selected wavelength, and which is produced by a laser scanner and projected onto the screen by the laser scanner's vertical raster generator 150. The emitted light 250 from selected fluorescent elements illuminated by the laser light beam is viewed by a user of the flat-panel projection display 10.

Figure 2A:
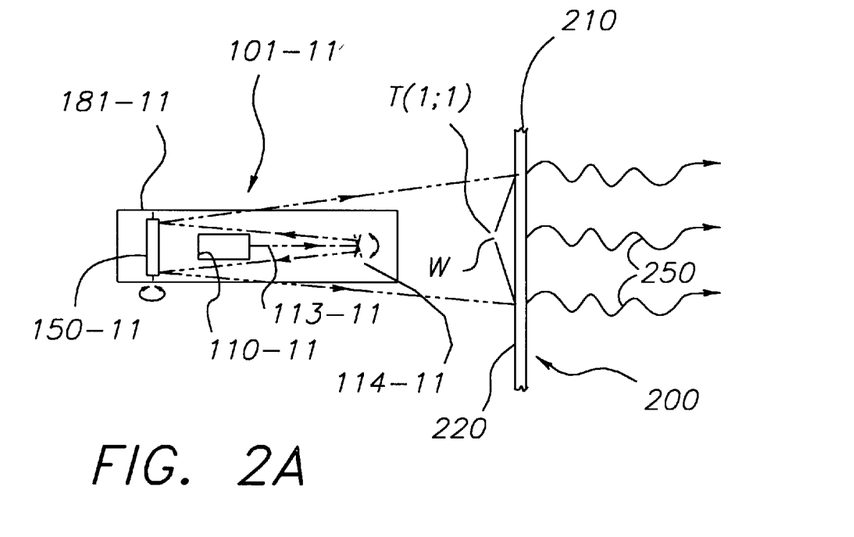
FIG. 2A is a schematic plan view of a laser scanner projecting a tile T onto a color display screen, in which a vibrating mirror is depicted as a horizontal scanline generator in accordance with the present invention.
Figure 2B:
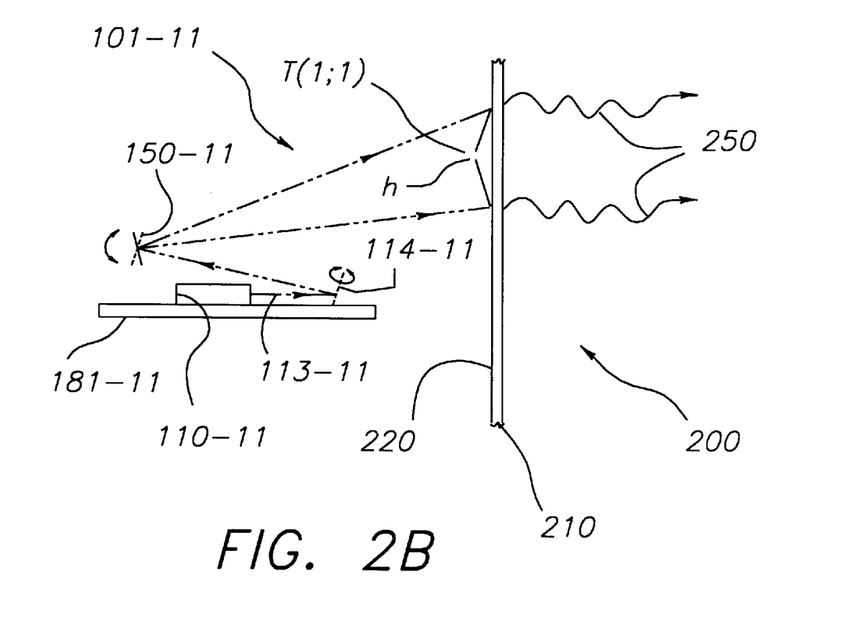
FIG. 2B is a schematic side view of the laser scanner and the color display screen of FIG. 2A showing an oscillating mirror as a vertical raster generator which projects the tile onto the display screen.

Referring now to FIGS. 2A and 2B, a schematic plan view and a schematic side view, respectively, of a laser scanner 101-11 is depicted as projecting a tile T(1;1) onto a color display screen 200. The sub-designations "-11" refer to parts or functions which are dedicated to projecting a tile T(1;1) onto the screen 200.

On a support 181-11 are disposed along optical axes a laser diode 110-11 emitting a laser light beam 113-11 which is directed onto a horizontal scanline generator 114-11. In the embodiment shown in FIGS. 2A and 2B, the horizontal scanline generator 114-11 is a vibrating mirror, as indicated by the double arrows. The vibrating mirror forms horizontal scanlines by periodically deflecting the laser beam in a substantially horizontal direction. The horizontal scanline generator 114-11 directs the deflected laser beam onto a vertical raster generator 150-11, which is an oscillating mirror having a raster scan interval and a return interval. It is the vertical raster generator 150-11 which projects the tile T(1;1) onto the surface 220 of patterned fluorescent elements of the color display screen 200 as a raster-scanned laser light beam. The screen 200 has a light transmissive support 210 through which the red, green, and blue emitted light 250 is directed toward a viewer.

The laser light beam 113-11 emitted by the laser diode 110-11 has preferably a wavelength selected to be in the range of from 400–430 nm which causes the fluorescent elements disposed on the surface 220 of the display screen 200 to emit red, green, or blue light, respectively.

It will be appreciated that the vertical raster generator 150-11 in FIG. 2B is shown in a plane located above the plane of the laser light beam 133-11 for simplicity of presentation. Accordingly, the vibrating mirror 114-11 (horizontal scanline generator) is depicted as slightly tilted.

The laser diode 110-11 can be a frequency-doubled infrared laser diode, and alternatively, it can be a laser diode capable of emitting a beam of light in a wavelength range from 400–430 nm directly. It will be appreciated that a suitably configured laser scanner controller (not shown) can provide laser diode drive signals capable of modulating the intensity of the emitted laser light beam 113-11 in response to a controller input signal, and that such a laser scanner controller provides synchronized drive signals to the horizontal scanline generator 114-11 and to the vertical raster generator 150-11, thereby producing and projecting onto the display screen a raster-scanned laser light beam which illuminates selected fluorescent elements within the display tile T(1;1).

Figure 3A:
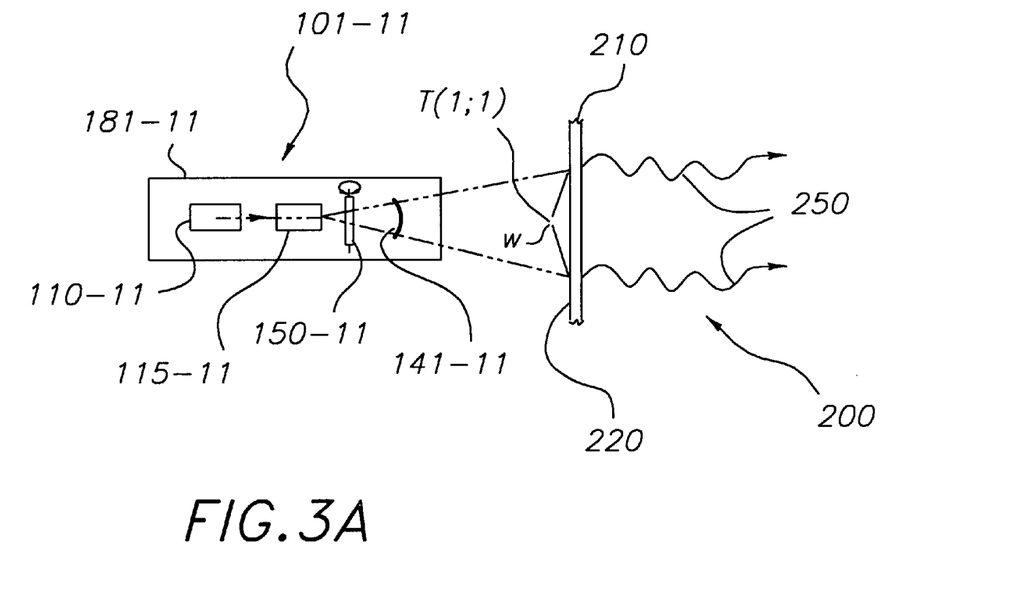
FIG. 3A is a schematic plan view of a laser scanner projecting a tile T onto a color display screen in which an optoelectronic device is depicted as a horizontal scanline generator and a concave beam reflector is shown to reflect horizontal scanlines onto a vertical raster generator in accordance with the present invention.
Figure 3B:
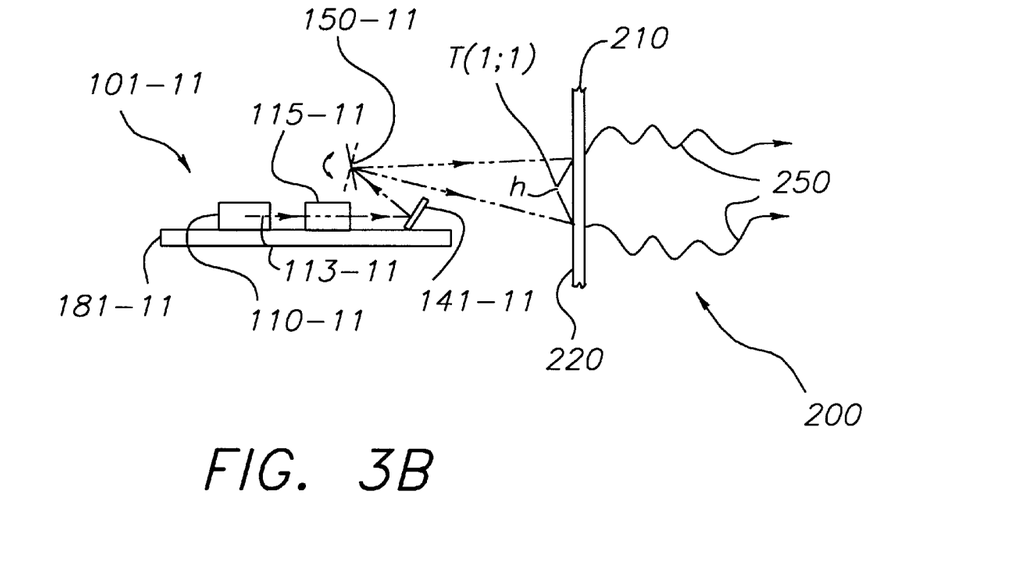
FIG. 3B is a schematic side view of the laser scanner and the color display screen of FIG. 3A showing an oscillating mirror as a vertical raster generator which projects the tile onto the display screen.

Referring now to FIGS. 3A and 3B, there are depicted a schematic plan view and a schematic side view, respectively, of a laser scanner 101-11 projecting a tile T(1;1) onto a surface 220 of a flat projection color display screen 200, with like numerals designating like parts or functions as described previously with reference to FIGS. 2A and 2B.

The laser scanner 101-11 depicted in FIGS. 3A and 3B differs from the laser scanner of FIGS. 2A and 2B in that a horizontal scanline generator 115-11 is a non-vibrating optoelectronic device adapted to receive the laser light beam 113-11 at one surface, and to provide from another surface a horizontally deflected laser beam comprising the horizontal scanlines. The horizontally reflected laser beam is directed onto a concave beam reflector 141-11 which directs the horizontal scanlines onto the vertical raster generator 150-11 at a reduced scanline length dimension. As indicated previously, the vertical raster generator 150-11 projects the raster-scanned laser light beam onto the surface 220 of the color display screen 200 as a display tile.

The horizontal scanline generator 115-11 is a solid-state optoelectronic device, preferably fabricated from ferroelectric materials and having a design which is functionally equivalent to the beam deflection portion as shown particularly in FIGS. 6A, 6B, and a FIG. 7 of commonly assigned U.S. Ser. No. 08/268,373 filed Jun. 29, 1994 titled "Ferroelectric Light Frequency Doubler Device With a Surface Coating and Having an Inverted Domain Structure" to Gupta et al, the disclosure of which is incorporated here by reference.

Figure 4:
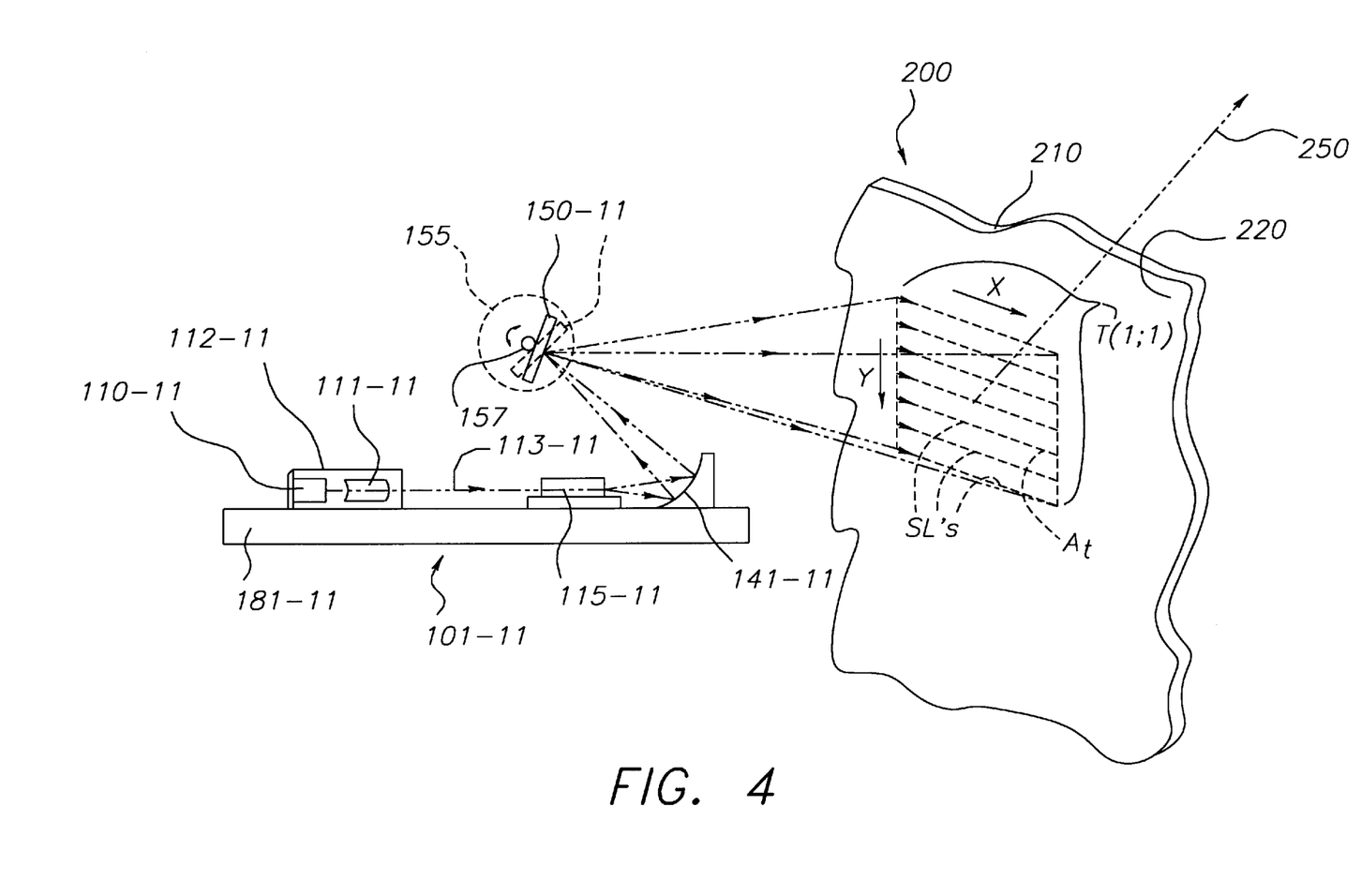
FIG. 4 is a more detailed schematic side view of a single laser scanner shown in FIGS. 3A and 3B and a perspective view of a portion of a color display screen having one two-dimensional tile of parallel horizontal scanlines projected thereon in accordance with the present invention.

Referring now to FIG. 4, there is shown a more detailed schematic side view of a single laser scanner described above with reference to FIGS. 3A and 3B. A laser diode 110-11 and a laser beam shaping optical element 111-11 are disposed in a common housing 112-11. The beam shaping optical element 111-11 serves to circularize a beam of noncircular cross section emitted by virtually all types of laser diodes. The circularized laser beam 113-11 is directed toward an entrance surface (not particularly designated) of a horizontal scanline generator 115-11 which provides, at an exit surface (not particularly designated) thereof a periodically horizontally deflected laser beam in a horizontal plane. This periodically horizontally scanning beam is directed by the concave beam reflector 141-11 onto the reflective surface of the vertical raster generator 150-11.

The vertical raster generator 150-11 is oscillated via a shaft 157 which is driven by a drive motor 155 so as to provide a raster scan interval and a return interval in response to appropriate motor drive signals applied thereto from a laser scanner controller (not shown). During the raster scan interval, the mirrored front surface of the vertical raster generator projects onto the surface 220 of the display screen 200 the tile T(1;1) as a raster scanned laser light beam of horizontal scanlines SL (parallel to an x-direction) and rastered vertically (along a y-direction). The arrows indicate the start of each scanline, and the scanlines are shown in dashed outline to indicate that the laser light beam 113-11, and thus its projection onto the screen, is intensity modulated, thereby illuminating only selected fluorescent elements within the display tile T(1;1) on the surface 220 which has a plurality of patterned fluorescent elements capable of emitting red, green, or blue light, respectively, upon illumination by the raster scanned laser light beam. Upon completion of a last horizontal scanline of the tile T(1;1), the vertical raster generator 150 is driven during a return interval to return to a position for projecting a first scanline of a subsequent tile in the same location on the screen.

Figure 5:
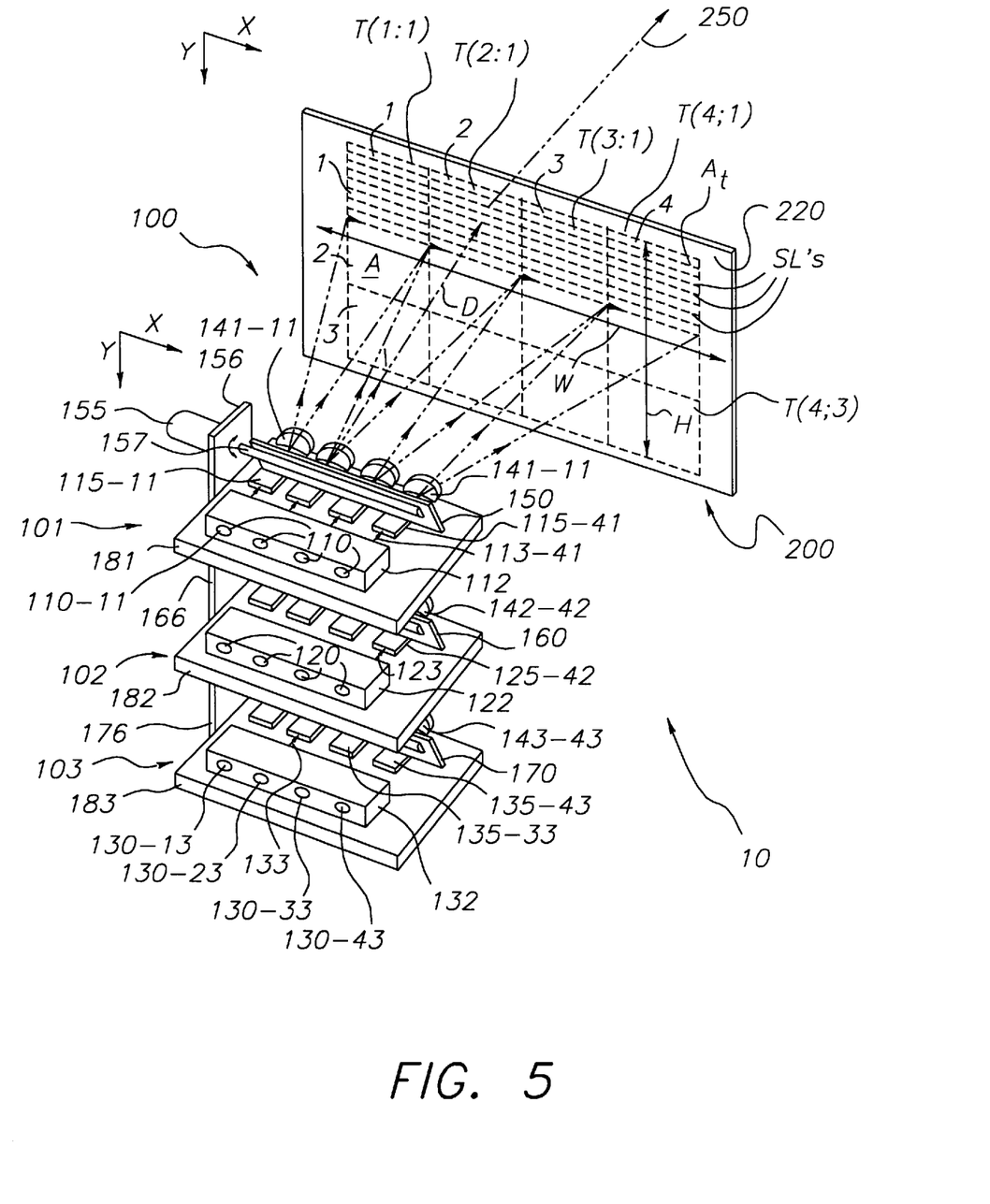
FIG. 5 is a schematic perspective view of a scaleable tiled flat-panel projection color display comprised of a flat projection display screen and a plurality of identical laser scanners arranged to form a two-dimensional laser scanner array in accordance with the present invention.

Referring now to FIG. 5, there is shown a schematic perspective view of a scaleable tiled flat-panel projection color display designated at 10, and comprised of a two-dimensional laser scanner array designated at 100, and a flat projection display screen designated at 200. For illustrative purposes only, the two-dimensional laser scanner array 100 is shown to comprise three laser scanner arrays 101, 102, and 103 arranged or stacked along a vertical axis (y) in an oriented relationship to one another. For illustrative purposes only, each laser scanner array is depicted as having four identical laser scanners disposed on a respectively common support 181, 182, and 183 side by side along a horizontal x-direction. Each of the plurality of identical laser scanners arranged to form the two-dimensional laser scanner array is a laser scanner as described above with reference to FIGS. 3A, 3B, and 4.

While only four laser scanners are shown for each of the three laser scanner arrays, it will be appreciated that the number of laser scanners per laser scanner array as well as the number of stacked laser scanner arrays, can be scaled in accordance with a scaled selected width dimension W and a selected height dimension H of the flat projection color display screen 200.

For clarity of presentation, only the uppermost laser scanner array 101 is shown as having projected onto the display screen 200 a raster-scanned laser light beam so as to form a row of four seamlessly abutting tiles of horizontal scanlines SL. The middle laser scanner array 102 would project a second row of tiles onto the display screen, where the tiles of the second row would seamlessly abut the corresponding tiles of the first row. Similarly, the bottom or the lower laser scanner array 103 would project a third row of seamlessly abutting tiles, thereby substantially filling the display screen 200 with display tiles which abut along an x-direction as well as along a y-direction.

Each of the laser scanner arrays 101, 102, and 103 has a respective laser diode array 110, 120, and 130 disposed in a corresponding common housing 112, 122, and 132. Not shown here, each laser diode has, within the housing, a beam-shaping optical element as described with reference to FIG. 4. Each of the laser diodes 110, 120, and 130 emit respective laser light beams 113, 123, and 133 of a wavelength in a range of between 400 and 430 nm. These laser beams are directed at respective horizontal scanline generators 115, 125, and 135 which produce periodically horizontally deflected laser beams forming the horizontal scanlines SL. These horizontal scanlines are received by respective concave beam reflectors 141, 142, and 143 and are reflected therefrom and directed at a reduced scanline length dimension onto a dedicated portion of a vertical raster generator which is common to all laser scanners of a laser scanner array. Thus, for example, each of the concave beam reflectors 141 projects a laser beam onto a portion of the vertical raster generator (a front surface mirror) 150 which is driven via a shaft 157 by a drive motor 155 mounted to a bracket 156. Similarly, a bracket 166 carries a drive motor (not shown) to drive the vertical raster generator 160 of the laser scanner array 102, and a bracket 176 supports a drive motor (not shown) to drive the vertical raster generator 170 of the laser scanner array 103. Each of the drive motors receive appropriate signals from a controller (not shown) to oscillate the vertical raster generators in a synchronized manner through a raster scan interval followed by a return interval.

As indicated above with reference to FIG. 4, a particular laser diode, its associated horizontal scanline generator, and a concave beam reflector are dedicated to project a particular tile onto the color display screen 200. For example, the laser diode 110-11, the horizontal scanline generator 115-11, the concave beam reflector 141-11, and a dedicated portion of the vertical raster generator mirror 150 are dedicated to projecting a tile T(1;1) onto the screen. Similarly, a laser diode 130-43 of the laser scanner array 103 is associated with a horizontal scanline generator 135-43, a concave beam reflector 143-43, and a dedicated portion of the vertical raster generator 170 to project a tile T(4;3) onto the display screen 200.

For clarity of presentation, the two-dimensional laser scanner array 100 is depicted without enclosure. It will be appreciated that the two-dimensional laser scanner array 100 will be enclosed in a housing adapted to accept the flat color display screen 200 at an opening thereof, as schematically indicated in FIG. 1.

The laser scanners of the two-dimensional laser scanner array 100, and the projection distance D between the display screen 200 and each of the vertical raster generators 150, 160, and 170, are operative and selected to provide seamlessly abutting display tiles on the color display screen. As previously described with reference to FIG. 1, each display tile area $A_t$ is preferably in a range of from 0.01 to 0.1 times the display screen area A. In FIG. 5, an effective display screen area A=H×W is substantially covered by 12 seamlessly abutting projected display tiles. Accordingly, each display tile has a file area of approximately 0.083×A.

Figure 6:
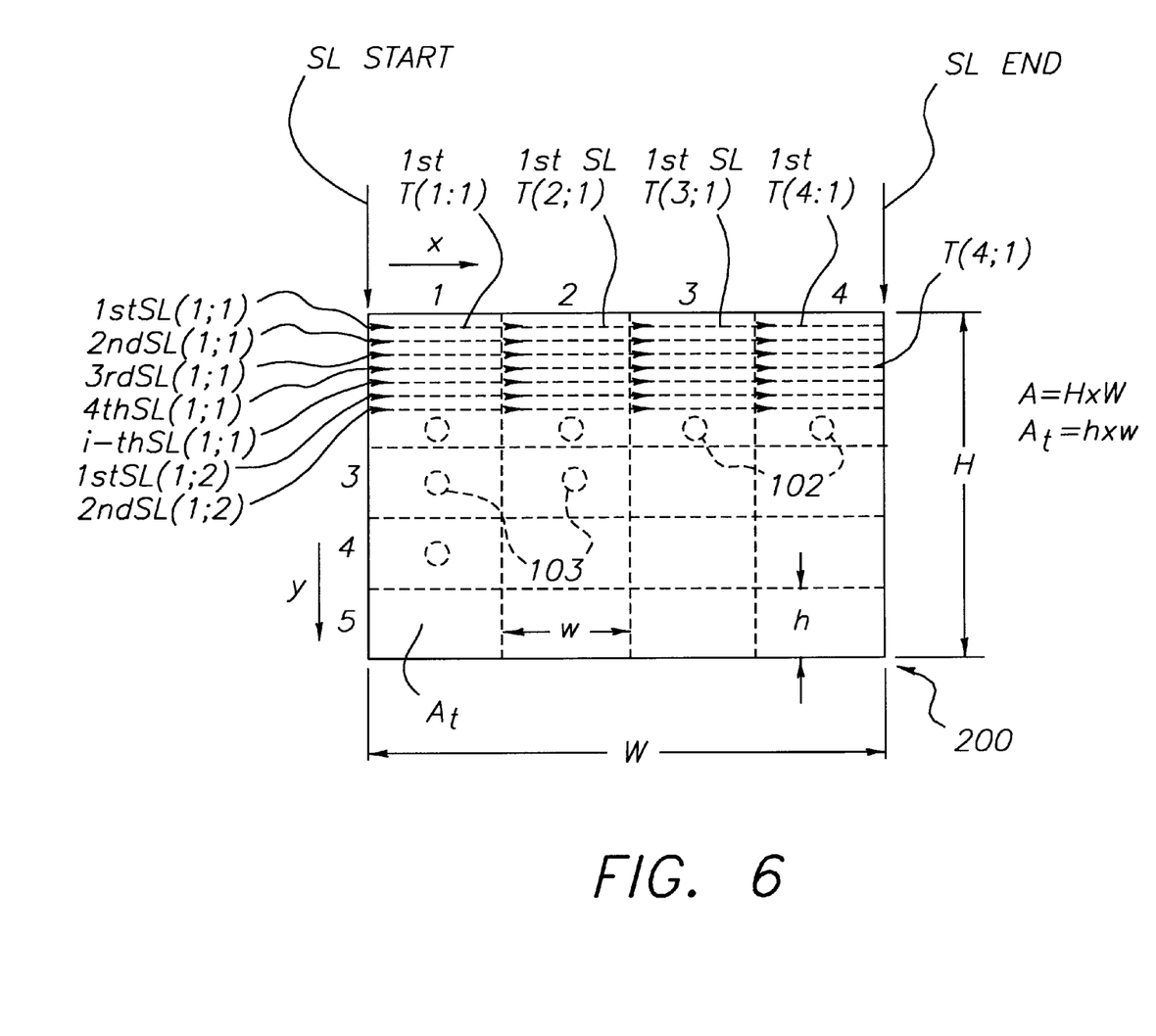
FIG. 6 is a plan view of a flat projection color display screen in accordance with the present invention which provides schematically details of horizontal scanlines and tile designations.

Referring now to FIG. 6, there is depicted a plan view of a flat projection display screen designated at 200, and further detailing the raster-scan sequence of horizontal scanline projection onto the screen 200 to form a first row of abutting tiles, and the first two horizontal scanlines of a second row of tiles which abut the first row of tiles. When viewed in conjunction with the description of FIG. 5, a first laser scanner of the laser scanner array 101 projects onto the screen 200 at a position designated as SL START a first scanline traversing a first tile (1;1) from left to right in FIG. 6. Synchronized with the termination of the first scanline at the end of tile T(1;1), a second laser scanner of the laser scanner array 101 commences to project an abutting first scanline which sweeps from left to right across the tile T(2;1) associated with that particular laser scanner. A first scanline for tile T(3;1) and tile T(4;1) is similarly projected onto and swept across the screen by respective third and fourth laser scanners of the laser scanner array 101. When the first scanline reaches the end of tile T(4;1) at a location indicated as SL END, a second scanline from the first laser scanner in the laser scanner array 101 commences to sweep from the scanline start position horizontally across the screen within tile T(1;1), and the scanning process of the laser scanners comprising the laser scanner array 101 continues through and including an i-th scanline being swept across the screen by the laser scanners dedicated to the respective tiles. Synchronized with the completion of the i-th scanline at the scanline end position SL END of tile T(4;1), a first laser scanner of laser scanner array 102 commences projecting a first scanline at the SL START position of the screen to begin the projection of a second row of tiles in the manner described above, and so forth.

It will be appreciated that the area $A_t$ of the projected tile, given by the product of a height dimension h of the tile and a width dimension w of the tile, is influenced by the aforementioned considerations, and further by the power (intensity) of the laser light emitted by the laser diodes of the two-dimensional laser scanner array, and the minimum spacing between the parallel horizontal scanlines projected onto the screen (a measure of perceived resolution and perceived display quality).

Figure 7A:
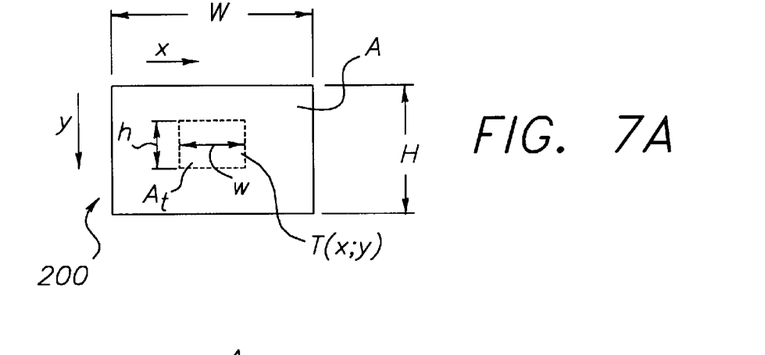
FIG. 7A is a schematic plan view of a flat projection color display screen indicating a display of a single tile projected from a single laser scanner in accordance with the present invention.
Figure 7B:
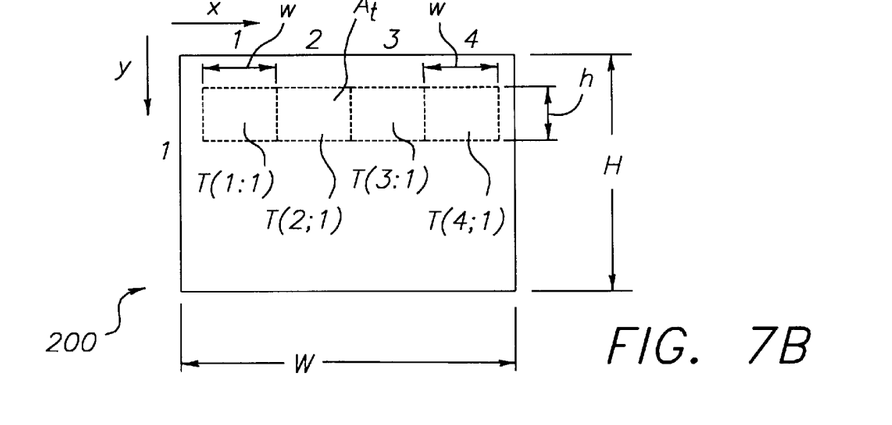
FIG. 7B is a schematic plan view of a flat projection color display screen indicating a display of a row of abutting tiles projected from a laser scanner array in accordance with the present invention.
Figure 7C:
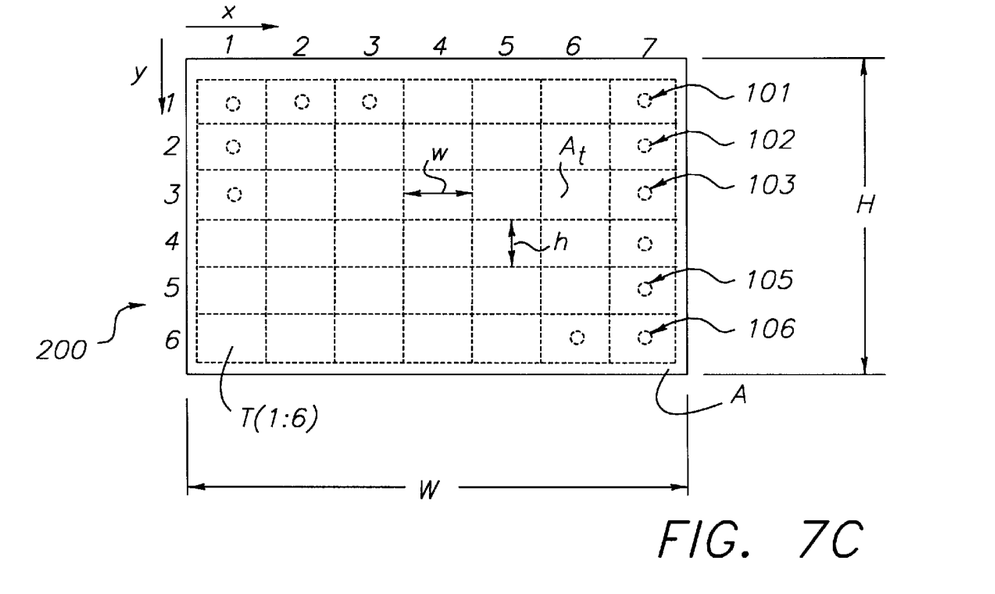
FIG. 7C is a schematic plan view of a flat projection color display screen indicating a plurality of abutting tiles projected from a plurality of laser scanners which form a two-dimensional array scaled in correspondence with desired width and height dimensions of the screen in accordance with the present invention.

Referring now to FIGS. 7A, 7B, and 7C, there are shown schematic plan views of a flat display screen generally designated at 200, and having a width dimension W parallel to an x-direction and a height dimension H parallel with a y-direction. Projected tiles T are shown in dashed outline, having a width dimension w and a height dimension h.

In FIG. 7A, a single laser scanner has projected a tile T(x;y) into the approximate center of the screen. Thus, the tile and the screen are not scaled with respect to each other.

FIG. 7B shows one horizontal row of four seamlessly abutting tiles projected onto the screen by a laser scanner array having four laser scanners positioned side by side, such as, for example, the laser scanner array 101 of FIG. 5. The row of abutting tiles and the display screen 200 are scaled with respect to each other along the x-direction.

In FIG. 7C, there is depicted a display screen 200 having a desired width dimension W and a desired height dimension H projected onto the screen from a scaled two-dimensional laser scanner array are six seamlessly abutting rows of tiles, with each row corresponding to seven laser scanners positioned side by side. The dotted circular outlines shown schematically centered within some of these tiles schematically indicate the rows of tiles projected by respectively dedicated laser scanner arrays 101 through 106 of a scaled two-dimensional laser scanner array 100. Thus, the two-dimensional laser scanner array and the display screen are scaled with respect to each other along the x-direction and along the y-direction.

Each projected tile is contiguous and with other projected tiles on all sides. There are no physical seams between individual tiles since the display screen can be uniformly patterned with fluorescent elements using any suitable techniques such as photolithography, silk-screen printing, ink-jet printing, or any other reprographic processes. The butting between individual display tiles is done entirely by electronic and optical means, thus it is possible to construct a large projection display simply by scaling the display screen size with an appropriate number of identical laser scanners.

Figure 8A:
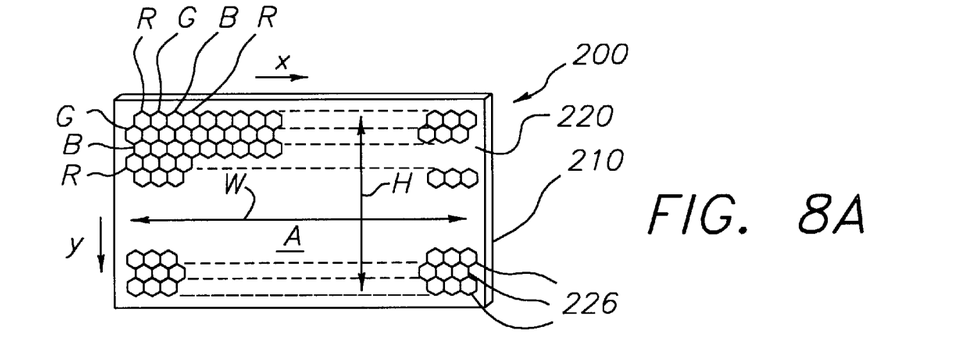
FIG. 8A is a schematic perspective view of a flat display screen having red, green, and blue light emitting patterned fluorescent elements formed as hexagons in accordance with the present invention.
Figure 8B:
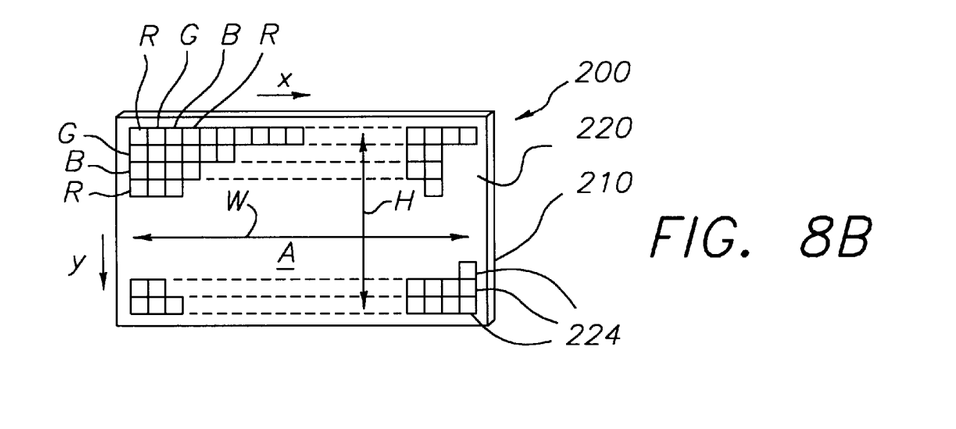
FIG. 8B is a schematic perspective view of a flat display screen having red, green, and blue light emitting patterned fluorescent elements formed as squares in accordance with the present invention.
Figure 8C:
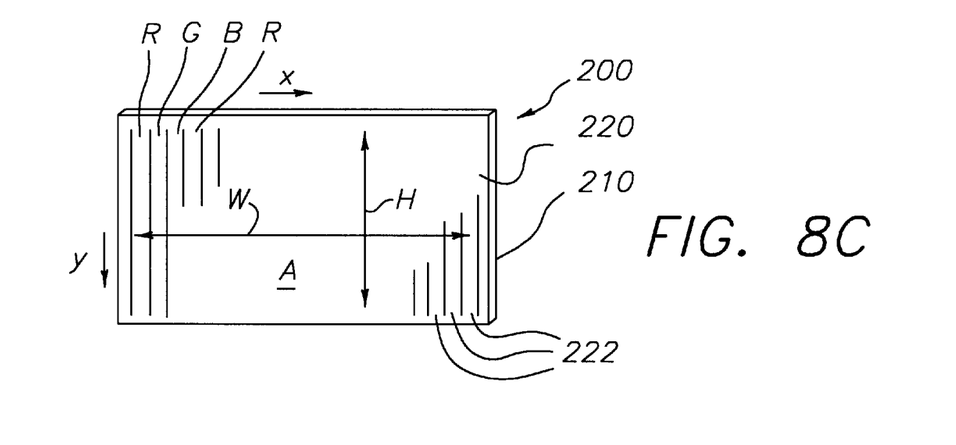
FIG. 8C is a schematic perspective view of a flat display screen having red, green, and blue light emitting patterned fluorescent elements formed as a sequence of parallel stripes in accordance with the present invention.

Referring now to FIGS. 8A, 8B, and 8C, there are shown schematic perspective views of flat projection color display screens generally designated at 200 having patterned fluorescent red, green, and blue elements on a surface 220 of a light transmissive support 210. Fluorescent elements are also referred to in the art as fluorescent picture elements or as fluorescent pixels.

The light transmissive support is preferably a glass support, or a plastic support such as, for example, a plastic sheet or foil support.

The plurality of patterned fluorescent elements are disposed on the surface 220 which is the surface upon which the laser light beam is projected from a laser scanner. Stated differently, these fluorescent elements are disposed on the surface 220 of the support 210 which is opposite a surface of the support from which the display screen is being viewed.

In FIG. 8A, there is shown a plurality of fluorescent elements which have a repeating pattern along the width dimension W and along the height dimension H of the screen of adjacent or closely spaced red, green, and blue light emitting hexagons 226.

FIG. 8B depicts a plurality of patterned fluorescent elements having a repeating pattern across the width dimension W and along the height dimension H of the screen of adjacent or abutting red, green, and blue light emitting squares 224.

FIG. 8C shows a plurality of patterned fluorescent elements having a repeating pattern across the width dimension W of the screen of adjacent or closely spaced red, green, and blue light emitting stripes 222 extending parallel to the height dimension of the screen.

Each of the red, green, and blue (R, G, B) fluorescent elements or fluorescent pixels includes at least one fluorescent material to provide the respective emission of red light, green light, and blue light upon stimulation by the laser light beam from a laser scanner or a laser scanner array. For example, the red light emitting patterned elements include at least one red light emitting fluorescent material; the green light emitting patterned elements include at least one green light emitting fluorescent material; and the blue light emitting patterned elements include at least one blue light emitting fluorescent material.

Fluorescent materials include organic fluorescent dyes, organic fluorescent pigments, dispersions of dyes and/or pigments in polymeric binder which can be a photopolymer, fluorescent polymers such as conjugated polymers, inorganic pigments, inorganic pigments dispersed in suitably selected polymeric binder, and mixtures of fluorescent materials.

Each of the red, green, and blue patterned fluorescent elements further include at least one fluorescent compound capable of absorbing a laser light beam having a wavelength of from about 400 nm to about 430 nm, thereby causing the respective fluorescent elements to emit red, green, or blue light.

One method of producing patterned fluorescent elements on a surface 220 of the display screen 200 is disclosed in U.S. Pat. No. 5,298,363, issued Mar. 29, 1994, entitled "Photolithographically Patterned Fluorescent Coating" which is commonly assigned and which is incorporated herein by reference.

The invention has been described in detail, but it will be understood that variations and modifications can be effected within the spirit and scope of the invention.

PARTS LIST

| | |
|---|---|
| 10 | tiled flat-panel projection display system |
| 100 | two-dimensional laser scanner array |
| 101 | laser scanner array |
| 102 | laser scanner array |
| 103 | laser scanner array |
| 110 | laser diode array |
| 110-11 | laser diode dedicated to a tile (1;1) |
| 111 | beam-shaping optical element |
| 112 | housing |
| 113 | laser beam |
| 113-11 | laser beam dedicated to a tile (1;1) |
| 113-41 | laser beam dedicated to a tile (4;1) |
| 115 | horizontal scanline generator |
| 115-11 | horizontal scanline generator dedicated to a tile (1;1) |
| 115-41 | horizontal scanline generator dedicated to a tile (4;1) |
| 120 | laser diode array |
| 122 | housing |
| 123 | laser beam |
| 125 | horizontal scanline generator |
| 125-42 | horizontal scanline generator dedicated to a tile (4;2) |
| 130 | laser diode array |

-continued

PARTS LIST

| | |
|---|---|
| 130-13 | laser diode dedicated to a tile (1;3) |
| 130-23 | laser diode dedicated to a tile (2;3) |
| 130-33 | laser diode dedicated to a tile (3;3) |
| 130-43 | laser diode dedicated to a tile (4;3) |
| 132 | housing |
| 133 | laser beam |
| 135 | horizontal scanline generator |
| 135-33 | horizontal scanline generator dedicated to a tile (3;3) |
| 135-43 | horizontal scanline generator dedicated to a tile (4;3) |
| 141 | concave beam reflector |
| 141-11 | concave beam reflector dedicated to a tile (1;1) |
| 141-41 | concave beam reflector dedicated to a tile (4;1) |
| 142 | concave beam reflector |
| 142-42 | concave beam reflector dedicated to a tile (4;2) |
| 143 | concave beam reflector |
| 143-43 | concave beam reflector dedicated to a tile (4;3) |
| 150 | vertical raster generator |
| 155 | drive motor dedicated to vertical raster generator 150 |
| 156 | bracket |
| 157 | drive shaft |
| 160 | vertical raster generator |
| 166 | bracket |
| 170 | vertical raster generator |
| 176 | bracket |
| 181 | support |
| 182 | support |
| 183 | support |
| 200 | projection display screen |
| 210 | light transmissive support |
| 220 | surface with fluorescent elements |
| 222 | fluorescent R, G, B color stripes |
| 224 | fluorescent R, G, B color squares |
| 226 | fluorescent R, G, B color hexagons |
| 250 | emitted R, G, B light |
| A | display screen area = H × W |
| $A_t$ | display tile area = h × w |
| D | projection distance between vertical raster generators and projection display screen |
| h | height dimension of a tile T |
| H | height dimension of display screen |
| R, G, B | red, green, blue fluorescent elements |
| SL | scanlines |
| T | tile(s) projected onto the projection display screen |
| w | width dimension of a tile T |
| W | width dimension of display screen |

What is claimed is:

1. A flat-panel projection color display, comprising:
  a) a projection display screen of area A having a light transmissive support, a plurality of patterned fluorescent elements on one surface of the support capable of separately emitting red, green or blue light;
  b) the display screen area A being subdivided into a plurality of identical display tiles, each individual display tile having an area $A_t$ and being seamlessly contiguous to at least one other display tile;
  c) a plurality of identical laser scanners arranged to form a two-dimensional array, each laser scanner being capable of projecting a laser beam onto a designated display tile for illuminating the patterned fluorescent elements;
  d) a projection distance D, being defined as the distance from the laser scanner to the display screen, is $=0.5\sqrt{A_t}$; and
  e) the area of an individual display tile $A_t$ being selected to be in the range of from 0.01 to 0.1 times the area A of the projection display screen.

2. The flat-panel projection color display according to claim 1 wherein each display tile is contiguous to at least one other display tile.

3. The flat-panel projection display of claim 2 wherein the light transmissive support for the display screen is either glass or plastic.

4. The flat-panel projection display of claim 2 wherein the plurality of patterned fluorescent elements are disposed on the one surface of the light transmissive support which is opposite a surface from which the display screen is being viewed.

5. The flat-panel projection display of claim 2 wherein the patterned fluorescent elements are adapted to separately emitting red, green, or blue light.

6. The flat-panel projection display of claim 5 wherein illuminating the selected patterned fluorescent elements with a laser light beam having a wavelength selected in a range of from about 400 nm to about 430 nm causes the fluorescent elements to produce a color display of red, green, and blue colors.

7. The flat-panel projection display of claim 6 wherein each of the patterned fluorescent elements further includes at least one fluorescent compound capable of absorbing a laser light beam having a wavelength selected in the range of from about 400 nm to about 430 nm, thereby causing the fluorescent elements to separately emit red, green, or blue light.

* * * * *